H. BASTOW.
HEADLIGHT.
APPLICATION FILED NOV. 24, 1916.
1,236,137.
Patented Aug. 7, 1917.
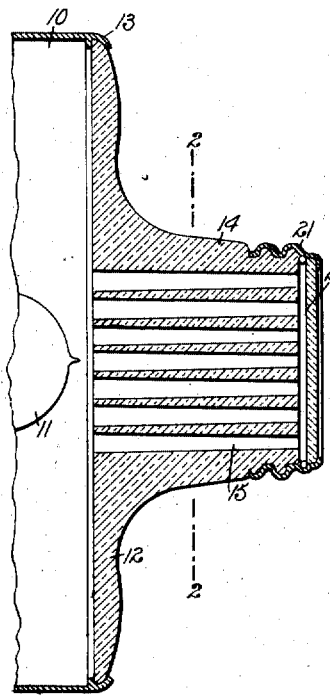
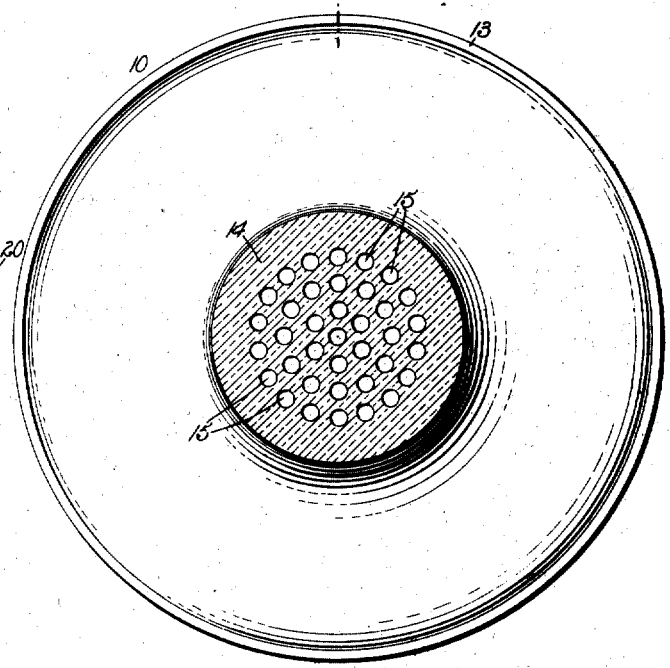
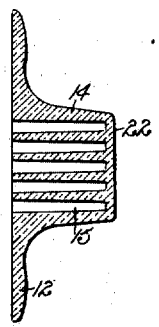
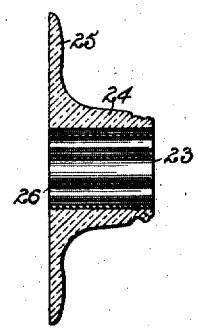
WITNESSES
H. F. Walker.
INVENTOR
Harry Bastow
BY
ATTORNEYS

UNITED STATES PATENT OFFICE.

HARRY BASTOW, OF CRAFTON, PENNSYLVANIA.

HEADLIGHT.

1,236,137. Specification of Letters Patent. Patented Aug. 7, 1917.

Application filed November 24, 1916. Serial No. 133,165.

*To all whom it may concern:*

Be it known that I, HARRY BASTOW, a citizen of the United States, and a resident of Crafton, in the county of Allegheny and State of Pennsylvania, have invented a new and Improved Headlight, of which the following is a full, clear, and exact description.

The object of the invention is to provide a new and improved headlight more especially designed for use on automobiles, autotrucks and other power-driven vehicles, and arranged to project sufficient light ahead of the vehicle for the proper illumination of the roadway without producing an undesirable glare liable to blind oncoming pedestrians or the drivers of approaching vehicles.

In order to produce the desired result, use is made of a lamp front comprising a light-diffusing disk provided with a spot light.

A practical embodiment of the invention is represented in the accompanying drawings forming a part of this specification, in which similar characters of reference indicate corresponding parts in all the views.

Figure 1 is a sectional side elevation of the headlight on the line 1—1 of Fig. 2;

Fig. 2 is a cross section of the same on the line 2—2 of Fig. 1;

Fig. 3 is a reduced sectional side elevation of a modified form of the lamp front; and Fig. 4 is a similar view of another modified form of the lamp front.

The casing 10 of the headlight is of usual construction and is provided with a lamp 11 of any approved construction. The inner face of the casing 10 is made reflecting and the front of the lamp is in the form of a light-diffusing disk 12 held in place at its peripheral edge by suitable attaching means 13 forming part of the casing 10. The light-diffusing disk 12 is preferably made of pressed clear glass etched on its surface to produce a light-diffusing effect for the rays of light emanating from the lamp 11. A translucent glass disk, however, may be used. The disk 12 is provided with a centrally disposed and forwardly projecting hub 14 provided with a spot light in the form of one or more openings 15 extending horizontally so that a portion of the rays of light emanating from the source of light 11 can pass directly out onto the roadway. As shown in Figs. 1 and 2, the spot light 15 is formed by a series of conical apertures having their small ends at the front end of the hub 14 and having their large ends at the inner face of the disk 12. It will be noticed that the spot light apertures 15 are of greater length in comparison with their diameters to limit very greatly the spread of the light rays passing through the apertures. It is evident that the road ahead of the vehicle is strongly illuminated at a given point and at the same time no direct rays of light are visible to an oncoming pedestrian or to the driver of an approaching vehicle. The spreading of the direct rays of light passing through the apertures 15 is prevented or obscured by etching the walls of the apertures.

In order to prevent the apertures 15 from being clogged up, use is preferably made of a lens or glass cover 20 mounted in a cap 21 screwed or otherwise attached to the forward end of the hub 14. A similar result may be obtained by making the outer end 22 of the hub of glass, as indicated in Fig. 1, so that the forward ends of the apertures 15 are closed up by the glass material but the direct rays of light can pass through the same. In case a lens is used as a cover the lens is shaped to further concentrate the rays of light passing therethrough.

If desired, a single spot light aperture 23 may be formed in the hub 24 of the disk 25, as shown in Fig. 4, and in this case the aperture 23 is filled with a nest of pipes 26 of corrugated sheet metal or other material to produce the effect of keeping the rays of direct light parallel and non-spreading.

It is understood that by using the disk 12 some of the rays of light emanating from the source of light 11 are diffused to provide a soft non-glaring illumination of the roadway immediately ahead of the vehicle and by using the spot light it is possible to more intensely illuminate the roadway a considerable distance ahead of the vehicle for the proper guidance of the vehicle and without producing an undesirable glare for oncoming pedestrians or the drivers of approaching vehicles.

The lamp front shown and described is very simple and durable in construction, can be cheaply manufactured and readily substituted for the glass in the ordinary front frames of the headlights now used on automobiles and like vehicles.

Having thus described my invention, I claim as new and desire to secure by Letters Patent:—

1. A lamp front, comprising a translucent disk having a centrally disposed hub shaped portion, provided with a plurality of openings for the passage of the ray of light.

2. A lamp front, comprising a light-diffusing disk, having a centrally disposed hub shaped portion containing a plurality of parallel openings extending at a right angle to the plane of the disk for the passage of direct rays of light.

3. A lamp front, comprising a translucent disk having a centrally disposed hub shaped portion provided with a plurality of tapering openings for the passage of the rays of light.

4. A lamp front, comprising a translucent disk, having a centrally disposed hub shaped portion containing a plurality of parallel openings extending at a right angle to the plane of the disk for the passage of direct rays of light, said openings being closed at their forward ends to exclude the entrance of foreign matter therein.

5. A lamp front, comprising a light-diffusing disk, having a centrally disposed hub shaped portion containing a plurality of parallel openings extending at a right angle to the plane of the disk for the passage of direct rays of light, said openings tapering throughout their length, with the smaller ends facing forward.

6. A lamp front, comprising a light-diffusing glass disk provided with a centrally disposed integral hub extending forwardly from the face of the disk, the said hub having a series of horizontally disposed spot light apertures.

7. A lamp front, comprising a light-diffusing glass disk provided with a centrally disposed integral hub extending forwardly from the face of the disk, the said hub having a series of horizontally disposed spot light apertures, and a glass cover on the front end of the said hub.

8. A lamp front, comprising a light-diffusing glass disk provided with a centrally disposed integral hub extending forwardly from the face of the disk, the said hub having a series of horizontally disposed spot light apertures, a glass cover extending across the front end of the said hub, and an attaching means for holding the cover in place on the hub.

9. A lamp front, comprising a light-diffusing glass disk provided with a centrally disposed integral hub extending forwardly from the face of the disk, the said hub having a series of horizontally disposed conical spot light apertures, the small ends of which are at the front end of the hub and the large ends of the apertures are on the inner face of the disk.

HARRY BASTOW.